(12) United States Patent
Douma et al.

(10) Patent No.: US 8,165,197 B2
(45) Date of Patent: Apr. 24, 2012

(54) METHOD AND APPARATUS FOR VIDEO UPSCALING

(75) Inventors: Peter Douma, Wyckoff, NJ (US); Motoyuki Koike, Washington Township, NJ (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 1174 days.

(21) Appl. No.: 11/987,814

(22) Filed: Dec. 5, 2007

(65) Prior Publication Data

US 2009/0148066 A1 Jun. 11, 2009

(51) Int. Cl.
*H04N 7/12* (2006.01)

(52) U.S. Cl. ............................... 375/240.01; 715/716

(58) Field of Classification Search .................. None
See application file for complete search history.

(56) References Cited

U.S. PATENT DOCUMENTS

| 7,116,717 | B1 | 10/2006 | Eshet et al. |
| 2002/0131511 | A1 | 9/2002 | Zenoni |
| 2007/0112811 | A1* | 5/2007 | Shen et al. .................... 707/101 |
| 2009/0083429 | A1* | 3/2009 | Krig ............................. 709/228 |
| 2009/0222730 | A1* | 9/2009 | Wixson et al. ................ 715/723 |

OTHER PUBLICATIONS

Motorola Manuel ~ "TMX-2010 Transport Multiplexer, ATSC Application Note", pp. 1-14, Mar. 2003.

* cited by examiner

*Primary Examiner* — Kevin C Harper
(74) *Attorney, Agent, or Firm* — Rader, Fishman & Grauer PLLC (57) ABSTRACT

Upscaling video data for presentation on a relatively high resolution display device is described. Supplemental video data corresponding to video data is accessed and acquired in response to a request to upscale the video data. The video data and the supplemental video data are combined to produce a combined video data for displaying particular video content on a destination display device at a resolution that is high relative to the local display device. Digital rights management information may be verified prior to producing the combined video data, and additional digital rights information may be applied prior to transmitting the combined video data to the destination display device. A device registration database may also be used to control production and transmission of the upscaled video to other devices.

24 Claims, 7 Drawing Sheets

METHOD AND APPARATUS FOR VIDEO UPSCALING

BACKGROUND OF THE INVENTION

1. Field of the Invention

This invention relates generally to video upscaling and more particularly to combining video data with supplemental video data to produce a combined video data for displaying video content on a higher resolution display.

2. Description of the Related Art

Video that is offered on the Internet is typically intended for display on a small screen, either due to bandwidth constraints or because it is destined for a smaller screen device. Standards for video encoders and decoders typically allow for different profiles and have different specifications for the profile, such as the buffer requirements for decoding.

The rendering of video content compressed according to the requirements of the small screen is not optimal when the content is sent to a larger screen display, particularly one having capacity for enhanced resolution as compared to the small screen.

Techniques that allow such video content to be better displayed on higher resolution screens are needed.

SUMMARY OF THE INVENTION

According to one aspect of the present invention, upscaling video data for presentation on a relatively high resolution display device is provided.

In one embodiment, video upscaling entails accessing stored video data that includes information for displaying a particular video content on a local display device at a first resolution. A request to upscale the video data for displaying the particular video content on an additional display device at a second resolution that is higher than the first resolution may then be received. To satisfy such a request, supplemental video data corresponding to the video data is accessed and acquired. Then the video data and the supplemental video data are combined to produce a combined video data that includes information for displaying the particular video content on the additional display device at the second resolution.

According to another embodiment, a digital rights management verification is provided in connection with the video upscale. This entails verifying a digital rights management information prior to combining the video data and the supplemental video data, wherein the verified digital rights management information controls one or more of storing or outputting the combined video data by the local display device.

According to another embodiment, digital rights management information is applied in connection with transmitting the upscaled video to other devices. This entails applying digital rights management information that is associated to the combined video data prior to allowing an output of the combined video data by the local display device, wherein the applied digital rights management information controls one or more of storing, playing or distributing the combined video data by a device other than the local display device (e.g., the destination display device).

According to still another embodiment, a device registration database is used to control production and transmission of the upscaled video to other devices. This may entail determining a destination device identifier corresponding to the additional display device, and querying a registered device database using the destination device identifier to determine the propriety of providing the combined video data to the additional display device.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
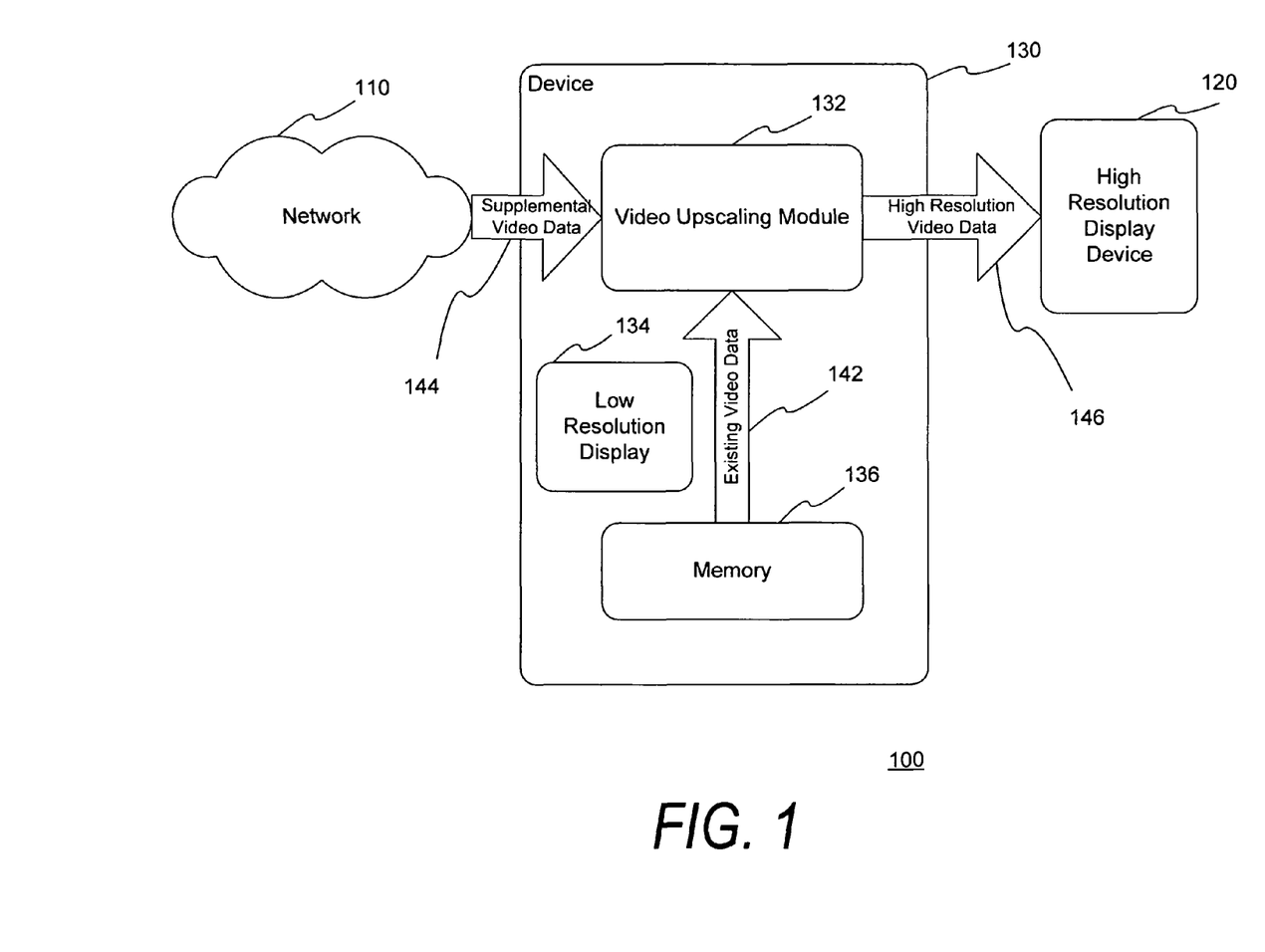
FIG. 1 is a schematic diagram illustrating an example of a system including a device configured to include a video upscaling module.

FIG. 1 is a schematic diagram illustrating an example of a system 100 including a device 130 configured to include a video upscaling module 132. According to one embodiment, the device 130 is a handheld device that is updated to include the video upscaling module 132.

The "low" and "high" resolution provided by the device 130 and the high resolution display device 120 refer to the relative resolutions provided by the two devices. That is, even if the resolution of the screen may be considered very good for a portable device, there are typically other devices having a relatively higher resolution capability and larger screen, such as HDTV. Thus, for example, the device 132 may include a screen of a few inches and a 480×272 pixel resolution, whereas the high resolution display device may be a television with a much larger screen and 720 p, 1080 i, or 1080 p capability (the latter providing 1920×1080 pixel resolution). Embodiments of the present invention are not limited to these particular numbers, as these are just examples of relatively low and high resolutions.

The device 130 preferably has a connection that allows content to be buffered into local memory for display on the (relatively) low resolution display 134 of the device 130. This may be a connection that allows the downloading or streaming of video content to the device through a network 110 such as the Internet. In this regard, the "local" device 130 stores "existing video data" (142) that is destined initially for display on the low resolution display 134 of the device, but that may be upgraded to provide the high resolution display a "destination" display device.

The video upscaling module 132 is configured to upscale the video for presentation on the relatively high resolution display device 120. The video upscaling module 132 is preferably configured as software but may alternatively comprise firmware or hardware, or various combinations of software, firmware and hardware.

The video upscaling module 132 is configured to access stored video data that includes information for displaying particular video content on a local display device at a first resolution (e.g., that of low resolution display 134). In response to a user request or the like, the video upscaling module 132 may then receive a request to upscale the video data for displaying the particular video content on an additional display device at a second resolution that is higher than the first resolution (e.g., the high resolution display device 120). To satisfy this request, the video upscaling module requests and receives supplemental video data corresponding to the video data. This may be performed through the described Internet connection or the like.

The video upscaling module 132 combines the existing video data and the supplemental video data to produce a combined video data that includes information for displaying the particular video content on the additional display device at the second resolution. In order to carry this out, the video upscaling module may buffer the existing, supplemental and combined video data in its memory 136, which is sized so as to accommodate the requirements of buffering the high resolution video content.

The device 132 may be a wide variety of devices. Merely by way of example, the device 132 may be based upon the PSP® (PlayStation® Portable) system provided by Sony Corporation of Tokyo, Japan. However, other examples include other handheld devices, handheld gaming devices, cellular phones, PDAs, or any device that has a processing platform and a local display screen that offers a first resolution level that can be low relative to another display. Still further, the present invention is not limited to handheld devices. The video content that subject to video upscaling may be video content originally destined for a personal computer (e.g., desktop or laptop) that is connected to another device having a display capability with a higher resolution.

Figure 2A:
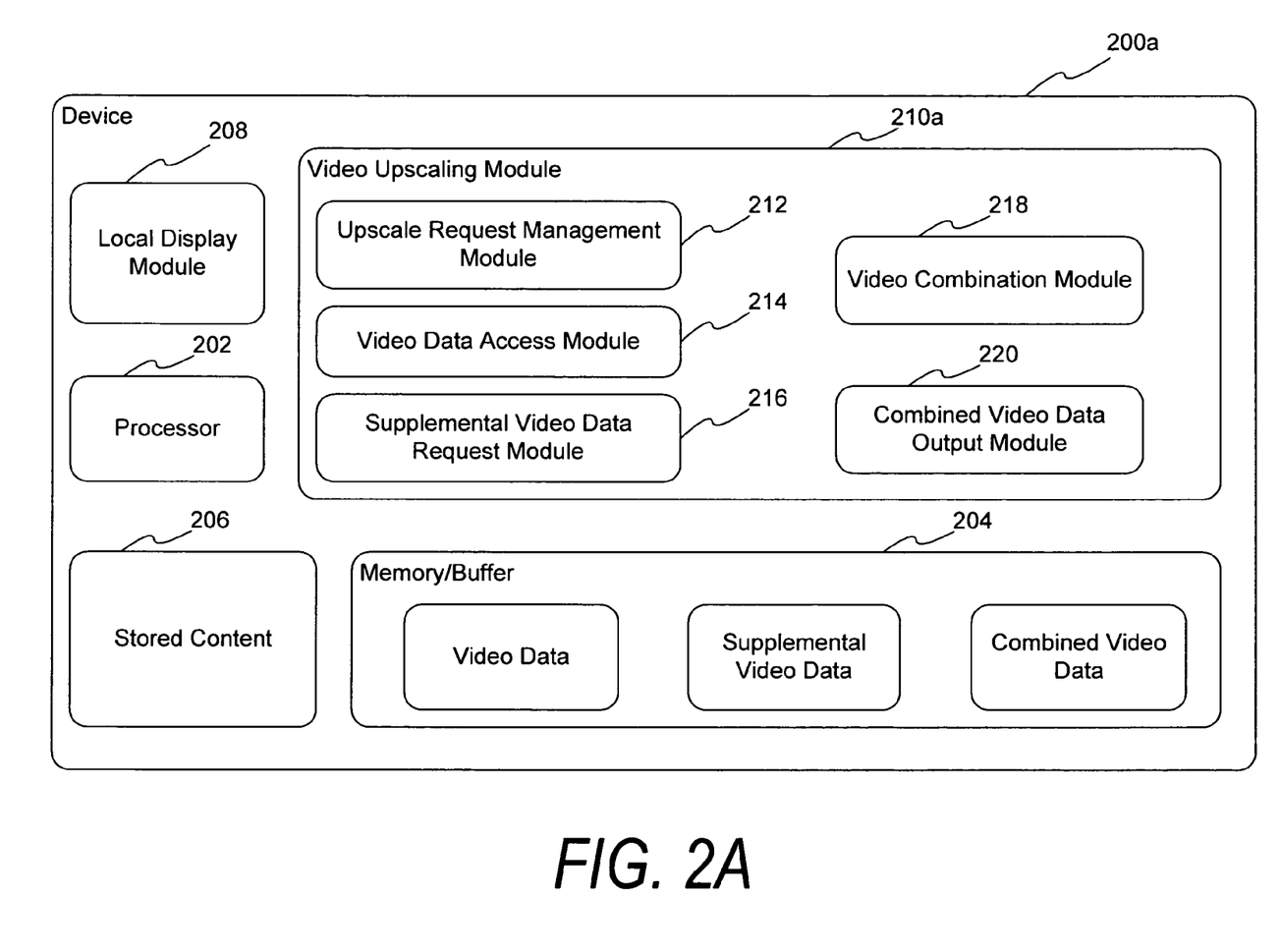
FIG. 2A is a block diagram of a device configured to include an example of a video upscaling module.

FIG. 2A is a block diagram of a device 200a configured to include an example of a video upscaling module 210a in further detail. The device 200a includes a processor 202, memory 204, additional storage 206, local display 208 and the video upscaling module 210.

The local display 208 is for displaying video data ordinarily processed and displayed by the device 200a, which may be buffered in memory 204 during a streaming of content to the device or stored in additional storage 206. The additional storage 206 may comprise a hard disk, a removable non-volatile flash memory, an optical disc or the like. This video data is configured according to the display requirements and constraints of the device 200a and local display 208.

The video upscaling module 210a upscales the video data by acquiring the supplemental video data and combining it with the existing video data to produce the combined video data. The video upscaling module 210a is preferably software executed by the processor 202 to provide the described functionality, but may also include firmware and/or hardware as noted.

The video upscaling module 210a may be provided in conjunction with a CODEC for processing the video data, supplemental video data and combined video data based upon compressed versions of the same. Preferably, the video upscaling module 210a is configured to include or work in conjunction with a CODEC that is at least MPEG-2 compliant. In addition to MPEG-2, other video compression technologies, whether based upon another standard (e.g., MPEG-4) or not may also be implemented.

The video upscaling module 210a includes an upscale request management module 212, a video data access module 214, a supplemental video data request module 216, a video combination module 218, and a combined video data output module 220. Although one example of the modules in the video upscaling module 210a is provided, the same functionality may be provided by fewer, greater, or differently named modules.

The upscale request management module 212 accommodates interfacing with a user to receive a request to upscale particular video content for displaying the particular video content on an additional display device. The video content may be any content that is typically stored and displayed by the local display 208 of the device in ordinary operation, including but not limited to movies, programs, advertisements, private video clips, or the like. Various interfacing with the user may be provided, including but not limited to displaying available options and receiving corresponding input through the local display 208 screen. This input may be received, for example, through a touch-sensitive screen wherein a stylus is used to provide user input. Alternatively, keyboards, buttons, audible commands, or any technique for interfacing with a user may be implemented.

In order to accommodate effective interfacing with the user, an initial determination is made as to whether the video content has been downloaded or streamed for local display on the device, and then another determination is made as to the availability of the supplemental video data used to produce a higher resolution version of the content. The latter determination may be made before a user requests an upscaling operation. That is, it is known before-hand whether supplemental video data is available for the particular video content. This would allow a library of video content that can be upscaled to be easily displayed for the user. Alternatively, the determination about the availability of higher resolution video content may be made in conjunction with a user request. That is, the user may be allowed to inquire about the availability of content upscaling for any local video content items.

Once it is determined that a request has been made and that the supplemental video data is available, processing to accommodate the request is initiated. The video data access module 214 accesses the existing video data, which includes the information for displaying the particular video content on the local display 208 according to the first resolution as dictated by the requirements and capabilities of the device 200a. This video data is found in the local memory/buffer 204.

In conjunction with accessing the local video data, the supplemental video data request module 216 governs the acquisition of the supplemental video data that corresponds to the video data. This supplemental video data is preferably accessed through an external source, such as through a network connection such that the supplemental video content may be streamed or downloaded to the device 200a. The device 200a preferably includes interfaces for making the required connection through a wired or wireless link. For example, a wireless connection to the user's WLAN may be used through an 802.11b, 802.11g, or Wireless-N type interface, or a standard wired connection to a LAN may be made. The WLAN or LAN may, in turn, allow connection to additional (e.g., Internet) resources.

The video combination module 218 then accesses the video data and the supplemental video data, and combines them to produce a combined video data that includes information for displaying the particular video content at a higher resolution than the resolution of the local device. To carry out this aspect, the memory/buffer 204 would be of a larger size than would be required for decoding typical video content that would be displayed on the local device 200a. As the video data is decompressed it may be multiplexed with the supplemental video data. The video data provides the basic information for the particular video content, and the supplemental video data provides the additional information to upscale the video frames for the particular video content. This multiplexing may be coordinated in conjunction with a Scalable Video Coding technique supported by the compression technique (e.g., MPEG) implemented by the system. The Scalable Video Coding may code the high resolution video in multiple layers, with a base layer providing the relatively lowest resolution and one or more additional layers adding improvements in resolution. The improvements in resolution may, for example, be provided by adding spatial resolution or SNR improvements in additional layer(s). These additional layer(s) provide the supplemental video data that is multiplexed with the existing video data to provide the combined video data appropriate for high resolution display.

Alternatively, the video data and the supplemental video data may be multiplexed while they are still compressed. This may be more efficient computationally but more difficult to carry out depending upon the compression scheme.

The combined video data output module 220 then outputs the combined video data for provision to the additional display having the higher resolution display. Various interfacing may be used to accommodate this transfer, but preferably the outputs of the device 200a are configured for appropriate interfacing with the high resolution display. For example, for interfacing with an HDTV television set, outputs may include component video or HDMI to retain the high resolution of the combined video for display on the destination display device. Other outputs whether wired or wireless may also be used.

Figure 2B:
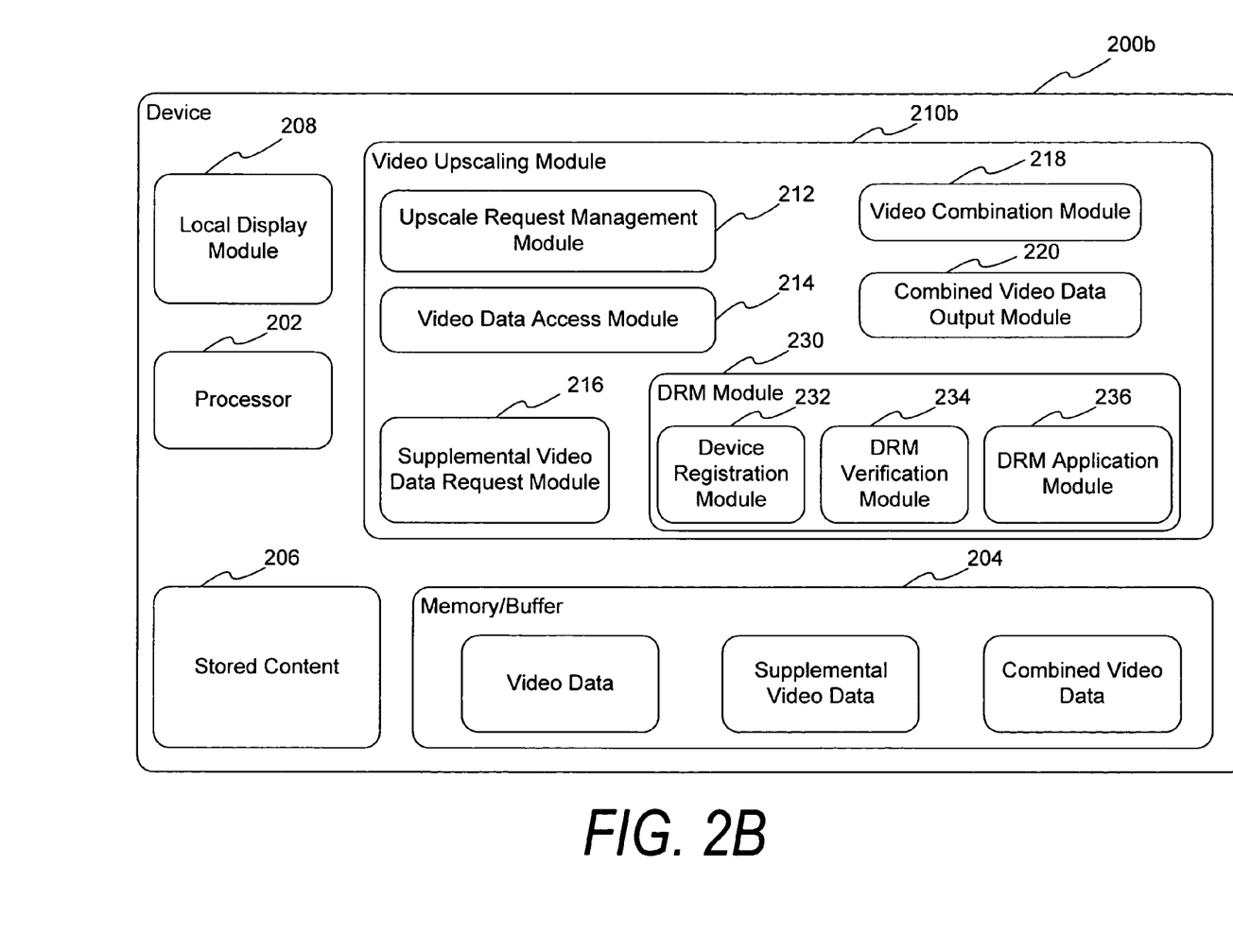
FIG. 2B is a block diagram of a device configured to include another example of a video upscaling module.

FIG. 2B is a block diagram of a device 200a configured to include another example of a video upscaling module 210b, wherein the video upscaling module 210b also includes a Digital Rights Management (DRM) module 230. The DRM module 230 verifies and applies DRM information associated with the upscaled video content and ensures that it is stored, distributed or otherwise processed by source and destination devices accordingly.

The DRM module 230 includes a device registration module 232, a DRM verification module 234 and a DRM application module 236. These modules 232, 234, 236 are optional, such that embodiments having a DRM module 230 may include one, two or all three corresponding functions.

The device registration module 232 allows verification that the destination display device may appropriately receive the combined (high resolution) video data. This may be in the form of a specific device registration wherein a given device is uniquely identified as appropriate, or it may be in the form of a device-type registration wherein a given type of device is indicated as appropriate for receiving the combined video data.

To further device registration and verification, the device registration module 232 may manage a local database of registered devices. This database may be populated externally as a separate operation, wherein the device 200a is updated in batch to indicate appropriate destination display devices. Alternatively, the database may be updated in conjunction with particular pieces of video content that are downloaded or streamed to the device. The database may thus include fields wherein a first video content may be appropriate for a first set of destination display devices, and a second video content may be appropriate for a second, potentially different set of destination devices.

To carry out the process of verifying a registered destination display device, the device registration module 232 may initially determine a destination device identifier corresponding to the additional display device. This may be performed by a handshaking procedure wherein information is exchanged between the device 200b and the additional display device. The module 232 then queries the registered device database using the destination device identifier to determine the propriety of providing the combined video data to the additional display device.

The DRM verification module 234 is configured to determine whether the processing being performed locally by the device 200b is in accordance with whatever digital rights management functions are applicable to the particular video content that the device 200b possesses. This may be performed as a prerequisite to allowing the device 200b to produce the combined video data. The digital rights management information is thus verified prior to combining the video data and the supplemental video data, with the digital rights management controlling, for example, whether the device 200b is allowed to store or output the combined video data.

The digital rights management information may be previously associated with the video data for the particular content in order to allow the DRM verification module 234 to carry out the rights protection functionality. Additionally, the verification may involve an external authority that confirms whether the device 200b may perform the video upscaling process. For example, the video data for the particular video content being upscaled may have an associated product identifier, and the device 200b may have a device identifier. This information may be passed to the external authority, which may authorize the transmission of the supplemental video data to the device 200b upon verification of the rights for the particular device and corresponding product (video data). The external authority may be the supplier of the video data and/or supplemental video data, or may be another party all together. The verification processes may be performed through a network connection such as the Internet.

The DRM application module 236 applies digital rights management information that is associated to the combined video data prior to allowing an output of the combined video data by the local display device. This information protects the corresponding content going-forward, in that the applied digital rights management information controls one or more of storing, playing or distributing the combined video data by a (e.g., destination) device other than the local device 200b. This information may be appended to the combined video data by the DRM application module 236 as a pre-requisite to sending it to the destination device. Alternatively, passing the combined video data to the destination device may also be performed in conjunction with the external authority, which may associate a product identifier and device identifier respectively to the combined video data and the destination device. Thus, a scheme similar to that described above for the DRM verification module 234 may subsequently be applied to enforce copy protection or other desired protection to the combined video data as stored, distributed, etc. by the destination device.

Figure 3:
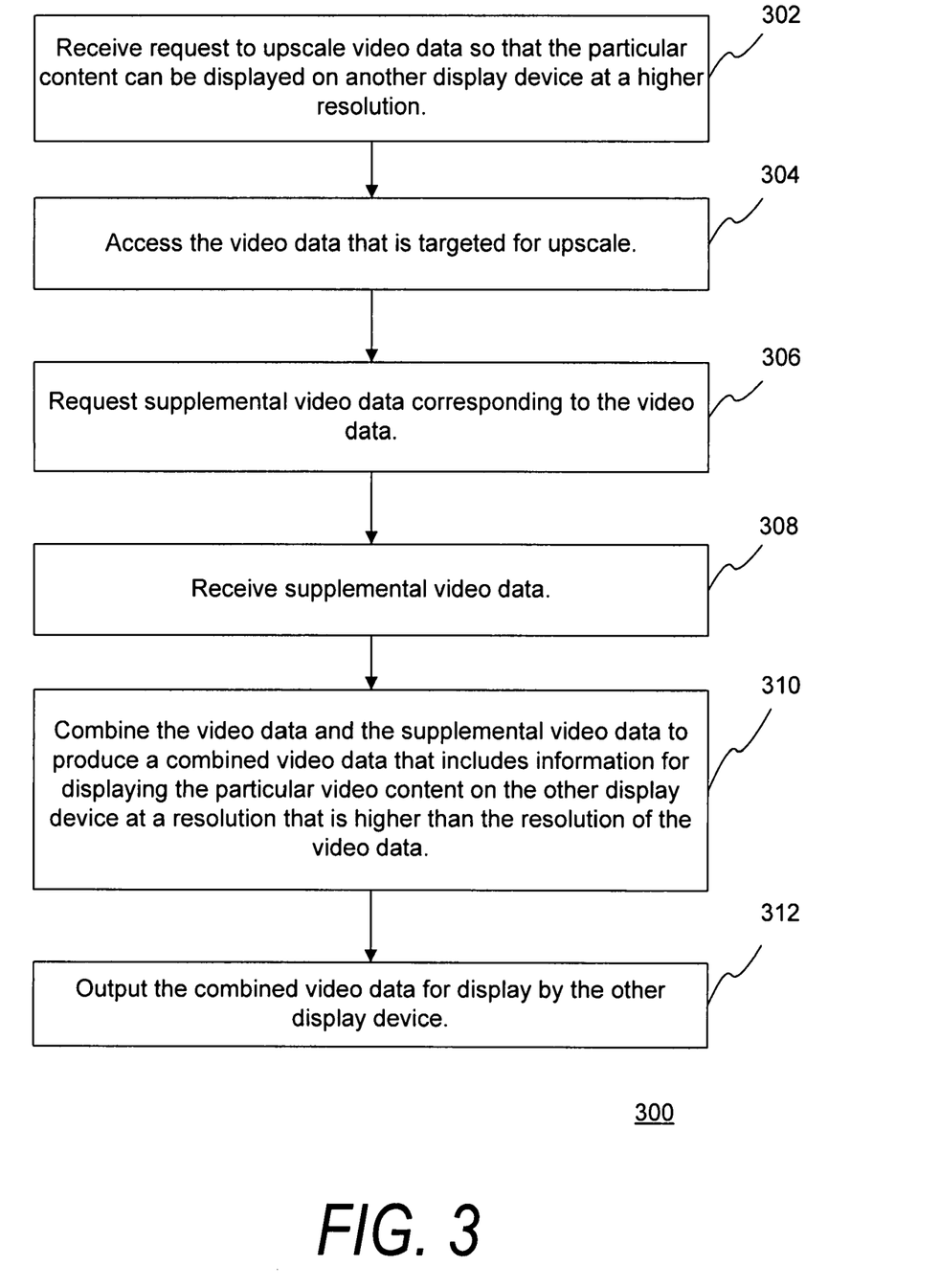
FIG. 3 is a flow diagram illustrating an example of a process for video upscaling.

FIG. 3 is a flow diagram illustrating an example of a process for video upscaling 300. Initially a request is received 302 to upscale video data used to display a particular video content so that the particular content can be displayed on another display device at a higher resolution. As described this request may be received using various interfacing techniques.

Upon receipt of the request, the video data that is targeted for the video upscaling operation is accessed 304 and a request 306 for supplemental video data corresponding to the video data is made. Preferably, the video data is resident in the local device and the request for supplemental video data is accommodated through network communication (e.g., Internet resources) with an external location that possesses the supplemental video data.

The connection to the external location is made and the supplemental video data is received 308. For example, the supplemental video data may be streamed to the local device and stored temporarily in a buffer resident therein. The buffer may be sized to accommodate the additional capacity required for buffering the existing, supplemental and combined video data.

The video data and the supplemental video data are then combined 310 to produce a combined video data that includes information for displaying the particular video content on the other (destination) display device. The resolution of the particular content as provided by the combined video data is higher than the resolution offered for the particular content by the regular video data. Examples of the relative resolution levels have been previously described.

Finally, the combined video data is output 312 for display by the other video device, with the output of the sending device being configured to correspond to the input of the receiving device, through an interface that accommodates the capacity required for the combined video data to support the high resolution display. Various interfaces may be supported as described previously.

Figure 4A:
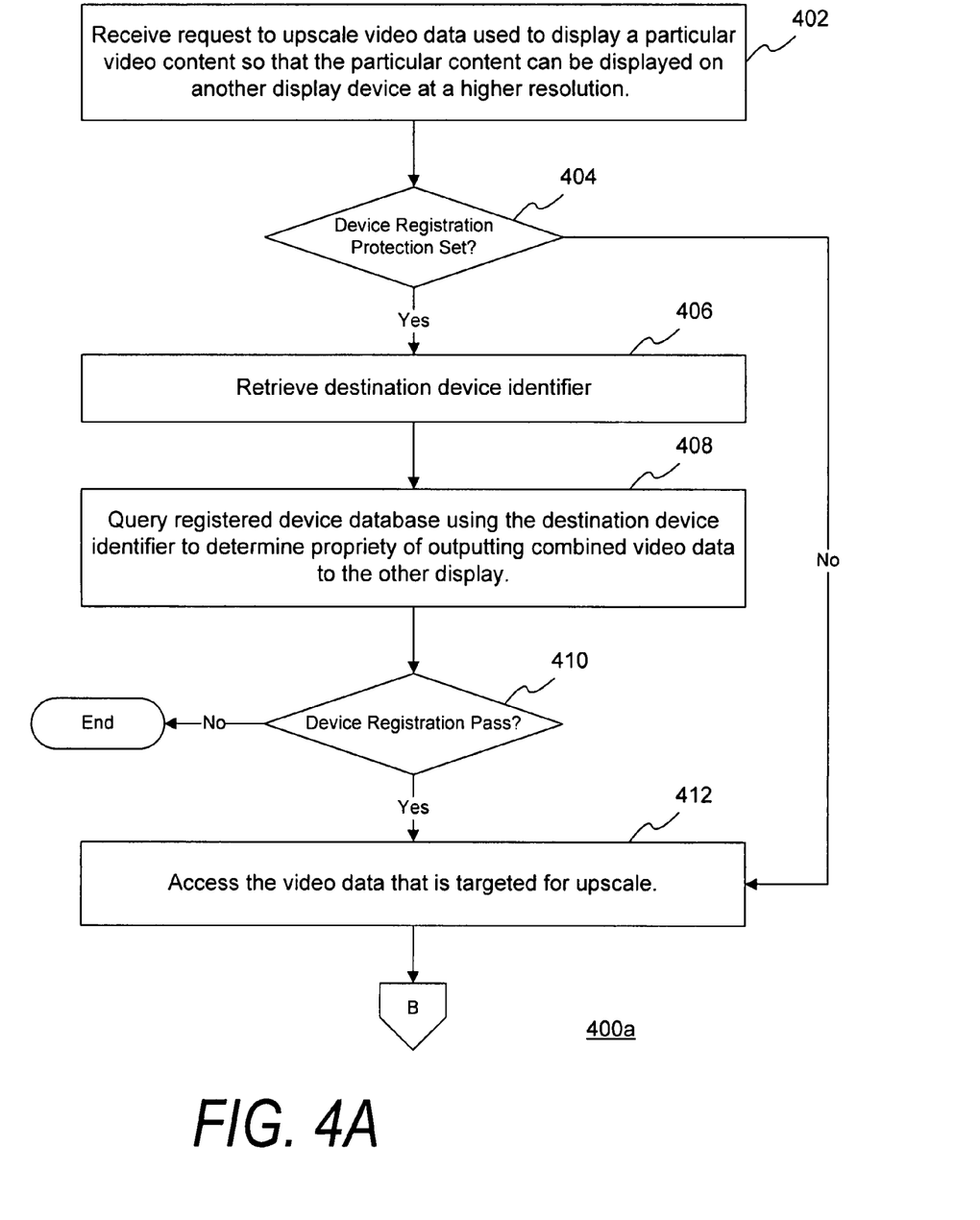
FIGS. 4A-C are flow diagrams illustrating another example of a process for video upscaling.
Figure 4B:
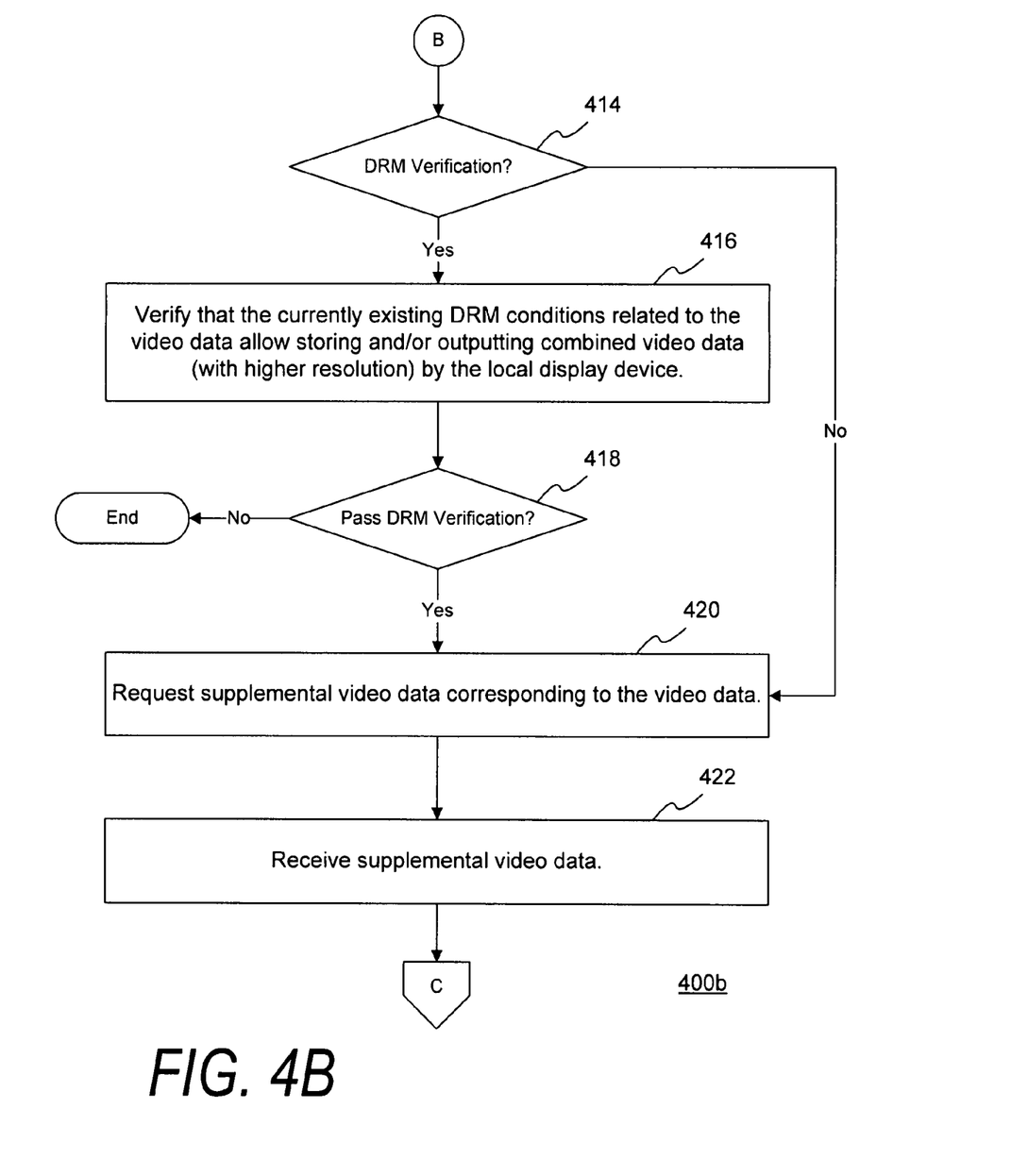
Figure 4C:
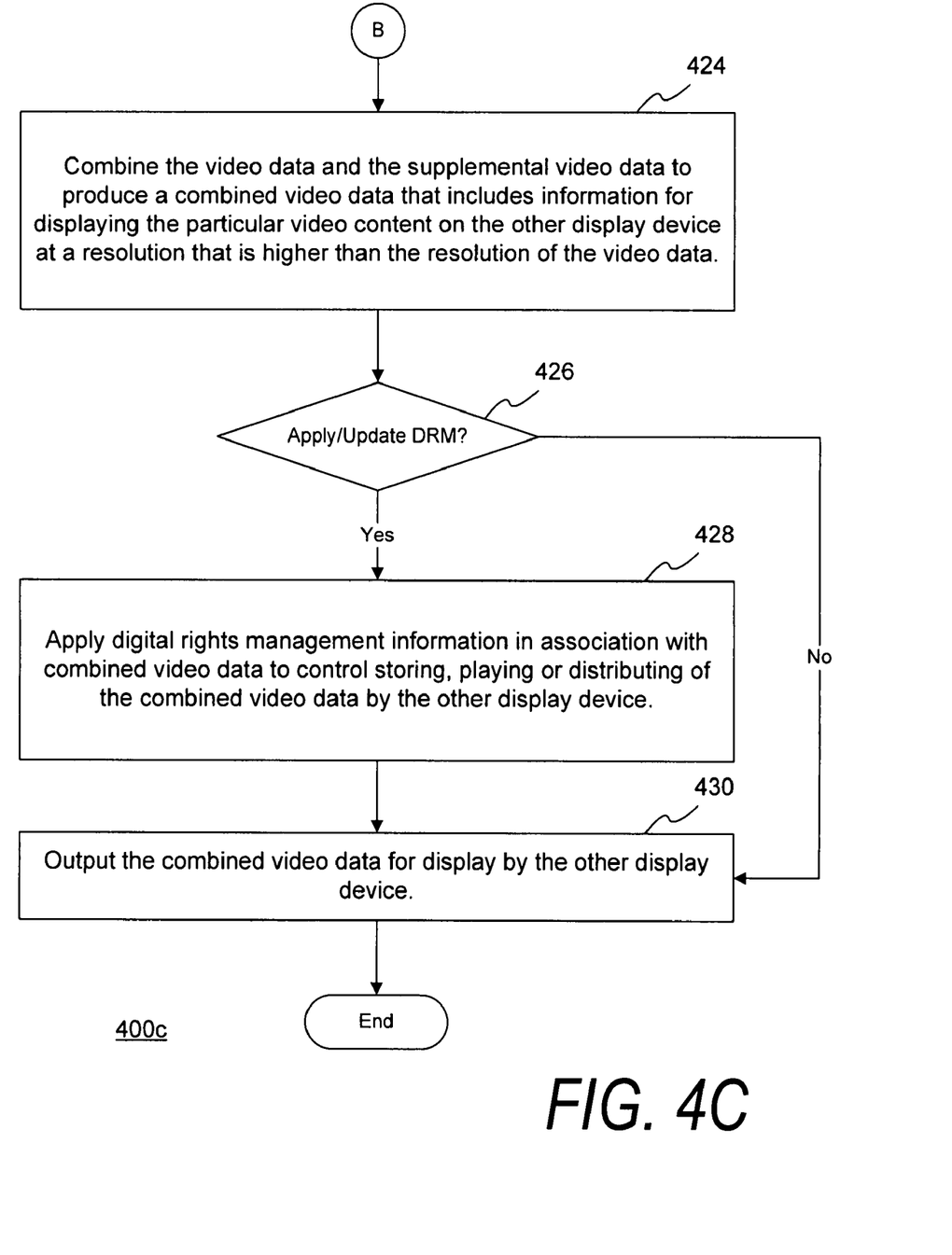

FIGS. 4A-C are flow diagrams illustrating another example of a process for video upscaling 400a-c wherein DRM processes are applied during the upscaling process. The process similarly initiates with receipt 402 of a request to upscale video data used to display a particular video content, with the upscaling modifying the corresponding video data to provide combined video data, which allows the particular video content to be displayed on another destination device at a higher resolution than is provided by the local display device.

A determination 404 is made as to whether device registration protocol is set as an active process. There, a determination is made as to whether it is appropriate for the desired destination device to receive upgraded video content from the local device. If device registration processing is set, then the destination device identifier is retrieved 406 and a registered device database is queried 408 using the destination device identifier to determine the propriety of outputting the combined video data to the other display. As described previously, the destination display device may have a unique identifier that is reflected in the registered device database. Alternatively, the destination display device may have a device identifier that actually represents the type (e.g., class, brand, etc.) of device. There, the device registration database may include identifiers corresponding to the device-types that are appropriate recipients of the combined video data that supports higher resolution display of the particular video content. If the device registration protection is set (403) and the destination device identifier is not reflected in the registered device database, then the process ends, with transmission of the combined video data being prevented. If this is the case, appropriate messages may be provided to the device user to remedy the situation (e.g., by asking the user to register the unknown destination device, etc.).

If device registration is not set (404) or if registration passes (410), then the video data that is targeted for upscale processes is accessed 412. Referring to FIG. 4B, the process continues by determining whether a DRM verification process should be applied (414). This may, for example, be determined by examining whether a DRM verification flag is set. If so, then a verification 416 that the currently existing DRM conditions related to the video data allow producing, storing, and/or outputting combined video data by the local display device.

The digital rights management information may be previously associated with the video data for the particular content in order to allow verification 416 pursuant to the rights protection functionality. The verification may involve an external authority that confirms whether the local device may perform the video upscaling process, such as through a product identifier for the video data for the particular video content being upscaled. This information may be passed to the external authority, which may authorize the transmission of the supplemental video data to the device to create the combined video data upon verification of the rights for the particular device and corresponding product (video data). As described above, the external authority may be the supplier of the video data and/or supplemental video data, or may be another party all together.

Passing (418) the DRM verification phase allows processing to continue, initially with a request 420 for the supplemental video data corresponding to the video data. The supplemental video data is then received 422, such as through an Internet connection made by the local device to a source of the supplemental content. Referring to FIG. 4C, the process 400c continues wherein the video data and the supplemental video data are combined 424 to produce the combined video data. This combined video data includes information for displaying the particular video content on the other (destination) display device at a resolution that is higher than the resolution produced by the video data typically used for displaying content on the local device.

Before the combined video data is output 430 for display by the other device, it is determined 426 whether DRM application processes should be implemented for the combined video data. If so, digital rights management information is applied 428 so that it is associated to the combined video data prior to allowing an output of the combined video data by the local display device. This information protects the corresponding content, with the applied digital rights management information controlling one or more of storing, playing or distributing the combined video data by the destination device. As previously described, this information may be appended to the combined video data as a pre-requisite to sending it to the destination device, or the external authority may associate a product identifier and device identifier respectively to the combined video data and the destination device prior to authorizing transmission of the combined video data by the local device.

Thus embodiments of the present invention produce and provide video upscaling. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for upscaling video for presentation on a relatively high resolution display device, the method comprising:
   accessing stored video data that includes information for displaying a particular video content on a local display device at a first resolution;
   receiving a request to upscale the video data for displaying the particular video content on an additional display device at a second resolution that is higher than the first resolution;

requesting and receiving supplemental video data corresponding to the video data, wherein the supplemental video data is accessed through an external source;

combining the video data and the supplemental video data to produce a combined video data that includes information for displaying the particular video content on the additional display device at the second resolution; and determining availability of the supplemental video data used to produce the particular video content on the additional display device at the second resolution before receiving the request to upscale the video data.

2. The method of claim 1, further comprising:

verifying a digital rights management information prior to combining the video data and the supplemental video data, wherein the verified digital rights management information controls one or more of storing or outputting the combined video data by the local display device.

3. The method of claim 1, further comprising:

applying a digital rights management information that is associated to the combined video data prior to allowing an output of the combined video data by the local display device, wherein the applied digital rights management information controls one or more of storing, playing or distributing the combined video data by a device other than the local display device.

4. The method of claim 1, further comprising:

verifying a digital rights management information prior to combining the video data and the supplemental video data, wherein the verified digital rights management information controls one or more of storing or outputting the combined video data by the local display device; and applying a digital rights management information that is associated to the combined video data prior to allowing an output of the combined video data by the local display device, wherein the applied digital rights management information controls one or more of storing, playing or distributing the combined video data by a device other than the local display device.

5. The method of claim 1, further comprising:

determining a destination device identifier corresponding to the additional display device; and querying a registered device database using the destination device identifier to determine the propriety of providing the combined video data to the additional display device.

6. The method of claim 4, wherein the second resolution is an HDTV resolution.

7. A system for upscaling video for presentation on a relatively high resolution display device, the system comprising:

means for accessing stored video data that includes information for displaying a particular video content on a local display device at a first resolution;

means for receiving a request to upscale the video data for displaying the particular video content on an additional display device at a second resolution that is higher than the first resolution;

means for requesting and receiving supplemental video data corresponding to the video data, wherein the supplemental video data is accessed through an external source;

means for combining the video data and the supplemental video data to produce a combined video data that includes information for displaying the particular video content on the additional display device at the second resolution; and means for determining availability of the supplemental video data used to produce the particular video content on the additional display device at the second resolution before receiving the request to upscale the video data.

8. The system of claim 7, further comprising:

means for verifying a digital rights management information prior to combining the video data and the supplemental video data, wherein the verified digital rights management information controls one or more of storing or outputting the combined video data by the local display device.

9. The system of claim 7, further comprising:

means for applying a digital rights management information that is associated to the combined video data prior to allowing an output of the combined video data by the local display device, wherein the applied digital rights management information controls one or more of storing, playing or distributing the combined video data by a device other than the local display device.

10. The system of claim 7, further comprising:

means for verifying a digital rights management information prior to combining the video data and the supplemental video data, wherein the verified digital rights management information controls one or more of storing or outputting the combined video data by the local display device; and means for applying a digital rights management information that is associated to the combined video data prior to allowing an output of the combined video data by the local display device, wherein the applied digital rights management information controls one or more of storing, playing or distributing the combined video data by a device other than the local display device.

11. The system of claim 7, further comprising:

means for determining a destination device identifier corresponding to the additional display device, and querying a registered device database using the destination device identifier to determine the propriety of providing the combined video data to the additional display device.

12. The system of claim 7, wherein the second resolution is an HDTV resolution.

13. An apparatus for upscaling video for presentation on a relatively high resolution display device, the apparatus comprising:

an access module, which accesses stored video data that includes information for displaying a particular video content on a local display device at a first resolution;

an upscale request management module, which receives a request to upscale the video data for displaying the particular video content on an additional display device at a second resolution that is higher than the first resolution;

a supplemental video request module, which requests and receives supplemental video data corresponding to the video data, wherein the supplemental video data is accessed through an external source;

a video combination module, which combines the video data and the supplemental video data to produce a combined video data that includes information for displaying the particular video content on the additional display device at the second resolution; and a determining module, which verifies availability of the supplemental video data used to produce the particular video content on the additional display device at the second resolution before receiving the request to upscale the video data.

14. The apparatus of claim 13, further comprising:

a DRM module, which verifies a digital rights management information prior to combining the video data and the supplemental video data, wherein the verified digital rights management information controls one or more of storing or outputting the combined video data by the local display device.

15. The apparatus of claim 13, further comprising:
a DRM module, which applies a digital rights management information that is associated to the combined video data prior to allowing an output of the combined video data by the local display device, wherein the applied digital rights management information controls one or more of storing, playing or distributing the combined video data by a device other than the local display device.

16. The apparatus of claim 13, further comprising:
a DRM module, which verifies a digital rights management information prior to combining the video data and the supplemental video data, wherein the verified digital rights management information controls one or more of storing or outputting the combined video data by the local display device, and which applies a digital rights management information that is associated to the combined video data prior to allowing an output of the combined video data by the local display device, wherein the applied digital rights management information controls one or more of storing, playing or distributing the combined video data by a device other than the local display device.

17. The apparatus of claim 13, further comprising:
a device registration module, which determines a destination device identifier corresponding to the additional display device, and which queries a registered device database using the destination device identifier to determine the propriety of providing the combined video data to the additional display device.

18. The apparatus of claim 13, wherein the second resolution is an HDTV resolution.

19. A computer program product comprising a non-transitory computer readable medium including program code stored thereon for upscaling video for presentation on a relatively high resolution display device, the program code being executable to perform operations comprising:
accessing stored video data that includes information for displaying a particular video content on a local display device at a first resolution;
receiving a request to upscale the video data for displaying the particular video content on an additional display device at a second resolution that is higher than the first resolution;
requesting and receiving supplemental video data corresponding to the video data, wherein the supplemental video data is accessed through an external source;
combining the video data and the supplemental video data to produce a combined video data that includes information for displaying the particular video content on the additional display device at the second resolution; and
determining availability of the supplemental video data used to produce the particular video content on the additional display device at the second resolution before receiving the request to upscale the video data.

20. The computer program product of claim 19, wherein the operations further comprise:
verifying a digital rights management information prior to combining the video data and the supplemental video data, wherein the verified digital rights management information controls one or more of storing or outputting the combined video data by the local display device.

21. The computer program product method of claim 19, wherein the operations further comprise:
applying a digital rights management information that is associated to the combined video data prior to allowing an output of the combined video data by the local display device, wherein the applied digital rights management information controls one or more of storing, playing or distributing the combined video data by a device other than the local display device.

22. The computer program product of claim 19, wherein the operations further comprise:
verifying a digital rights management information prior to combining the video data and the supplemental video data, wherein the verified digital rights management information controls one or more of storing or outputting the combined video data by the local display device; and
applying a digital rights management information that is associated to the combined video data prior to allowing an output of the combined video data by the local display device, wherein the applied digital rights management information controls one or more of storing, playing or distributing the combined video data by a device other than the local display device.

23. The computer program product of claim 19, wherein the operations further comprise:
determining a destination device identifier corresponding to the additional display device; and
querying a registered device database using the destination device identifier to determine the propriety of providing the combined video data to the additional display device.

24. The computer program product of claim 19, wherein the second resolution is an HDTV resolution.

* * * * *